United States Patent [19]

Carter

[11] Patent Number: 4,813,527
[45] Date of Patent: Mar. 21, 1989

[54] CONVEYOR SYSTEM FOR ROD-LIKE ARTICLES

[75] Inventor: David C. M. Carter, Coventry, England

[73] Assignee: Molins PLC, London, United Kingdom

[21] Appl. No.: 790,750

[22] Filed: Oct. 24, 1985

[30] Foreign Application Priority Data

Oct. 24, 1985 [GB] United Kingdom ............... 8426894

[51] Int. Cl.⁴ ................................................ B65G 1/04
[52] U.S. Cl. ...................................... 198/347; 131/909; 198/607; 198/594
[58] Field of Search ............... 198/347, 594, 627, 425, 198/632, 417, 812, 604, 605, 607; 131/282, 909; 53/148, 236

[56] References Cited

U.S. PATENT DOCUMENTS

| | | | |
|---|---|---|---|
| 3,665,933 | 5/1972 | Molins et al. | 198/347 X |
| 4,042,112 | 8/1977 | Molins et al. | 198/417 X |
| 4,120,391 | 10/1978 | Molins et al. | 198/607 X |
| 4,269,299 | 5/1981 | Goodman, Jr. | 198/347 |
| 4,273,233 | 6/1981 | Hinchcliffe et al. | 198/347 |
| 4,365,703 | 12/1982 | Hinchcliffe et al. | 198/347 |
| 4,423,996 | 1/1984 | Applegate et al. | 414/391 |
| 4,553,660 | 11/1985 | Bennett et al. | 53/148 X |
| 4,580,939 | 4/1986 | Dyett et al. | 198/347 X |
| 4,717,009 | 1/1988 | Carter et al. | 198/347 |

FOREIGN PATENT DOCUMENTS

| | | | |
|---|---|---|---|
| 360134 | 11/1931 | United Kingdom | 198/632 |
| 995663 | 6/1965 | United Kingdom . | |
| 1299175 | 12/1972 | United Kingdom | 198/347 |
| 2006604 | 5/1979 | United Kingdom | 198/347 |

Primary Examiner—Frank E. Werner
Assistant Examiner—D. Glenn Dayoan
Attorney, Agent, or Firm—Antonelli, Terry & Wands

[57] ABSTRACT

A variable capacity reservoir (88) for rod-like articles in stack formation comprises a variable length elevator (26) having an upper outlet (66) which rises and falls with the level of articles in the reservoir. The elevator (26) includes an endless band (24) which may be projected upwards from the floor of the reservoir (88), an extending membrane (44) shielding articles in the reservoir from engagement with a return run of the band. The reservoir (88) may receive filter rods and be located at or closely adjacent to a filter cigarette assembling machine.

7 Claims, 2 Drawing Sheets

CONVEYOR SYSTEM FOR ROD-LIKE ARTICLES

This invention relates to a conveyor system for rod-like articles, particularly articles of the tobacco industry such as cigarettes and cigarette filter rods.

According to one aspect of the invention a conveyor system for rod-like articles comprises means defining a path for rod-like articles in multi-layer stack formation, said path having a vertical component of direction, conveyor means for moving articles on said path, and means for moving at least part of the path defining means to vary the length of said path.

The path defining means preferably comprises spaced means defining opposite sides of said path. Said spaced means preferably comprises parallel members. The path defining means many include conveyor means and may, for example, comprise spaced opposed conveyor means, which may include one or more endless band conveyors and/or one or more pairs of laterally spaced endless conveyors. The path defining means may include said conveyor means for moving articles on said path, and said moving means may be arranged to move at least part of said conveyor means to vary said path length. The path defining means may include means defining a change in direction in said path, so that said path includes a variable length part extending in one direction and a constant length part extending in a different direction. The path defining means may further include first means defining a first side of the path and second means defining a second side of the path, the first and second sides being relatively movable to vary the length of the path.

In a preferred arrangement the conveyor system comprises first and second spaced conveyor means arranged so that said conveyors partially overlap by a variable amount to define a variable path length. The first and second spaced conveyor means are preferably parallel and preferably extend substantially vertically, but may be inclined and/or include horizontal portions. One of the first and second conveyor means may comprise one or more endless band conveyors passing around fixed position rotatable guide means, the other of the conveyor means comprising one or more endless bands passing around at least one rotatable guide means which is movable relative to said fixed guide means. In this arrangement rod-like articles may be supplied to a first part of the path defining means, e.g. to a fixed supply position adjacent one of said fixed guide means, and be conveyed through said path to a variable height delivery position adjacent said movable guide means. Alternatively the flow of articles on said path may be reversed, so that the supply position is variable and the delivery position fixed. Both supply and delivery positions could be variable, and irrespective of whether the supply or delivery positions (or both) are variable the supply position may be above, below or at the same level as the delivery position.

The conveyor system is particularly usefully employed where it is required to convey rod-like articles between levels which differ in height by a variable amount. For example, in a system where articles are supplied to a variable capacity storage region it may be desirable to vary the position at which articles enter the storage region according to the current state of fill of the storage region, e.g. so that articles are delivered at or adjacent the upper level of articles currently in the storage region. A system embodying a variable path length may be usefully employed in such an arrangement.

According to another aspect of the invention a conveyor system for rod-like articles comprises supply conveyor means for supplying rod-like articles in multi-layer stack formation to a variable capacity storage region or reservoir, the supply conveyor means including delivery means from which articles are supplied to the reservoir, and means for moving the delivery means in accordance with the level of articles in the reservoir, the supply conveyor means including a variable path length for rod-like articles in multi-layer stack formation. The reservoir may include means defining a storage region, and the supply conveyor means may comprise opposed elevating conveyors of variable height. The delivery means, elevator conveyor and a sensor for level of articles in the storage region may be movable together under control of said sensor, so that the delivery means is arranged to deliver articles at a level which bears a substantially constant relationship to the level of articles in the storage region. Further conveyor means may be provided for delivering a multi-layer stream of articles in stack formation from the storage region; this further conveyor means may be arranged at the same level as a static part of the supply conveyor means, or may be arranged at a different level.

A conveyor system incorporating a variable capacity storage region may be usefully employed in the delivery of filter rods to a filter cigarette assembling machine. Thus, a conveyor system for supplying filter rods to a filter cigarette assembling machine may include a variable capacity buffer reservoir, preferably at or closely adjacent to the machine, a supply conveyor for delivering filter rods in multi-layer stack formation to the reservoir from a filter rod conveyance system, a delivery conveyor for conveying filter rods in multi-layer stack formation from the reservoir to said machine, and means for varying the path length of said supply conveyor according to the state of fill of said reservoir.

According to a further aspect of the invention a conveyor system for rod-like articles comprises endless band conveyor means defining a path for a stream of articles in multi-layer stack formation, said path having a vertical component of direction, means for supplying articles in multi-layer stack formation to said path at a first position, means for delivering articles in multi-layer stack formation from said path at a second position, and means for moving at least one of said positions. Preferably the path length between said first and second positions is varied by said moving means. Preferably said endless band conveyor means comprises spaced opposed conveyors. Said moving means may comprise means for extending an operative run of at least one of said conveyors. The delivery means may include spaced opposed conveyors, at least one of which extends in a direction which is different from the direction of said path.

According to a further aspect of the invention a conveyor system for rod-like articles includes endless band conveyor means at least partly defining a path for rod-like articles in multi-layer stack formation, guide means for said endless band conveyor means, means for moving said guide means to vary the length of said path, and means movable with said guide means for shielding said conveyor means from engagement with articles not on said path. The endless band conveyor means may include spaced flights or other protrusions intended to increase traction to aid conveyance of articles on said path. The shielding means may comprise a flexible membrane which holds articles away from the flights, e.g. on a return run of the conveyor means where the latter projects into a region containing articles.

Endless band conveyor means provided with guide means movable in position to vary the length of operation of the conveyor means on a multi-layer stream in stack formation may be at least partially supported by extendable support means for the guide means. Thus the endless band conveyor means may pass around guide means in the form of one or more pulleys which are themselves supported by suitable telescoping or pivoted inter-linked structures having surfaces adapted to support the inner faces of the band or bands of the conveyor means.

The invention will be further described, by way of example only, with reference to the accompanying diagrammatic drawings, in which.

Figures 1, 2:
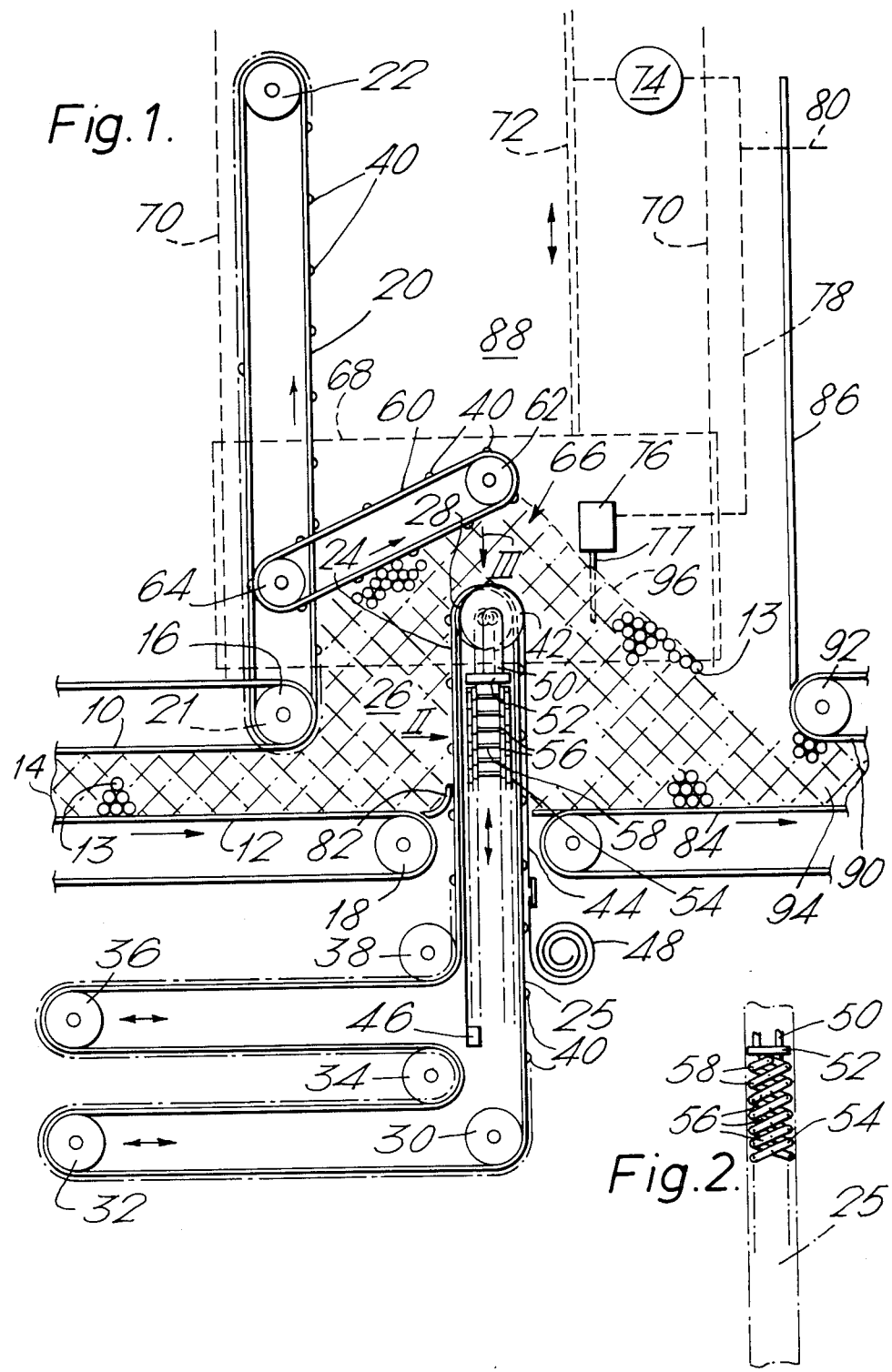
FIG. 1 shows a conveyor system for filter rods.
FIG. 2 is a view in the direction of arrow II in FIG. 1.

FIG. 1 shows a conveyor system for filter rods, which may be associated with a cigarette assembling machine, such as Molins PA8. The conveyor system may form part of the filter rod supply system of that machine, and may therefore receive filter rods from a receiving device of a pneumatic filter rod conveyance system, such as Molins APHIS, and deliver the rods to the hopper or other receiving device of the assembling machine. Alternatively, the filter rods could be delivered to the conveyor system from a mass flow conveying device, such as Molins POLAR, or from a tray unloading machine, such as Molins TUDOR.

The conveyor system includes a receiving conveyor, comprising spaced band conveyors 10, 12 defining a path 14 for conveying a multi-layer stream of filter rods 13. The stream on path 14 is typically about 90–120 mm in height. The upper conveyor 10 passes around an end pulley 16. The lower conveyor 12 extends somewhat further than the upper conveyor 10 and passes around an end pulley 18. One or both of the conveyors 10, 12 could comprise laterally spaced bands.

A substantially vertical endless band conveyor 20 passes around a lower pulley 21 which is coaxial with the pulley 16 and around an upper pulley 22. The conveyor 20 is laterally spaced relative to the conveyor 10. A further substantially vertical endless band conveyor 24 projects upwards from a position beyond the end pulley 18 and defines, together with a part of the conveyor 20, a substantially vertical path 26 arranged to receive filter rods from the path 14. The conveyor 24 comprises laterally spaced endless bands 25 (Figures 2,3) which pass around coaxial upper pulleys 28 and a further series of pulleys 30-38 arranged below the conveyor 12. The pulleys 28 are vertically movable, and the pulleys 32 and 36 are spring loaded and movable in a generally horizontal direction to allow movement of the positions of the bands 25 of conveyor 24. Instead of the pulleys 30-36 an alternative arrangement of pulleys for the conveyor 24 could be provided with at least one of the pulleys and part of the storage position of the conveyor at a level above that of the conveyor 12, thereby reducing space occupied below the conveyor 12; this arrangement is only practicable where the conveyor 12 is relatively short and the path 14 is directed so that interference between the stored part of conveyor 24 and the path 14 can be avoided.

Figure 3:
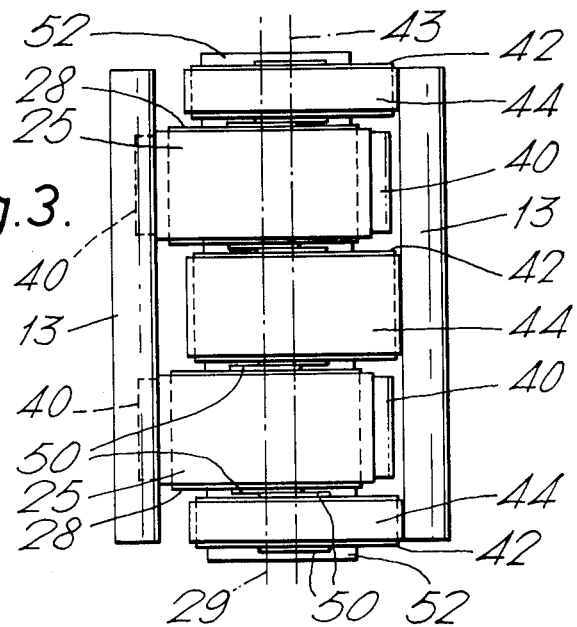
FIG. 3 is a view in the direction of arrow III in FIG. 1.

The conveyors 20 and 24 are formed with spaced flights 40, intended to increase traction between the conveyors and the filter rods. Adjacent the pulleys 28, as shown particularly in FIG. 3, are three further pulleys 42, which are coaxial about an axis 43 which is slightly offset relative to the axis 29 of the pulleys 28. Flexible membranes 44 extend upwardly from a fixed position 46 (FIG. 1) arranged below the level of conveyor 12, around the pulleys 42, and are connected to a spiral spring 48, again at a level below the level of conveyor 12.

The pulleys 28, 42 are rotatably attached to support flanges 50 and a cross-bracket 52. Extending downwardly from the bracket 52 in the region of each band 25 of the conveyor 24 is an expanding member 54 comprising a series of spaced links 56 pivoted on pins 58 so that the device operates in a manner similar to that of a so-called "lazy tongs" device.

An inclined conveyor 60, comprising one or more endless bands provided with flights 40 and passing around pulleys 62, 64 is arranged above the path 26, and defines with the upper part of the conveyor 24 a further path or outlet 66. The conveyor 60 and its associated pulleys 62, 64, and the pulleys 28, 42 are mounted on a head unit 68. The unit 68, which is indicated by dotted lines in FIG. 1 and comprises a support structure axially outside the path of the filter rods, is vertically movable on guides 70 under action of a chain hoist 72 driven by a motor 74. A sensor 76, which may be in the form of a proximity detector having a probe 77, is mounted on the unit 68 and is connected to the motor 74 by a signal line 78. One or more other signal lines 80 may pass from the sensor 76.

A curved guide-plate 82 extends from the end of the conveyor 12 to a position adjacent the vertical run of the conveyor 24 in the region of the transition between the paths 14 and 26. A similar guide-plate (not shown) may be positioned between the intersection of conveyors 20 and 60; this guide-plate would be movable with the head unit 68.

A delivery conveyor 84 extends from the region of the conveyor 24 at the same level as the receiving conveyor 12 but on the opposite side of conveyor 24. The delivery conveyor 84 could be at a lower or higher level than the conveyor 12. Extending above a downstream portion of the conveyor 84 is a substantially vertical wall 86 which, together with the conveyor 20 partially defines a storage region or reservoir 88 for filter rods. An upper delivery conveyor 90, passing around an end pulley 92 arranged at the lower end of the wall 86, defines with the lower delivery conveyor 84 a delivery path 94 for filter rods leaving the storage region 88.

In operation, the conveyor system provides a series of paths 14, 26, 66 leading into the storage region 88, and subsequently to a delivery path 94. The capacity of the region 88 is variable (as is that of the path 26, which may be regarded as part of the region 88), and in effect may be varied by vertical movement of the unit 68. The position of the unit 68 shown in FIG. 1 is intermediate its end positions and somewhat closer to its lowermost end position, at which the pulley 64 is substantially at the same level as the pulley 16 and the outlet 66 is a short distance above the delivery conveyor 84. These pulleys 16, 64 and the respective conveyors 20, 60 are arranged so that they are respectively laterally spaced. A flexible membrane 96 (which may be weighted or comprise a material such as TISS-METAL) may extend from the region of the pulley 62 and control the upper level of filter rods, particularly during initial conveyance of a stream through the conveyor system. In the uppermost position of the unit 68 the sensor 76 is at about the same level as the top of the wall 86. Typical dimensions of the storage region 88 are 1000 mm in width and 1300 mm in height, so that the maximum capacity of the region 88 is 20,000 filter rods of average diameter (8 mm).

Filter rods are delivered on the path 14 at a rate which is normally dependent on the rate of supply of the filter rods from the upstream supplying device. The conveyors 20, 24 and 60 are driven at speeds which are related to that of the conveyors 10, 12. The paths 14 and 26 (and 66) may be of substantially the same width, in which case the linear speeds of conveyors 10, 12, 20, 24 and 60 will normally be substantially the same. However, means may be provided for varying the relative speeds of these conveyors (e.g. by providing variable speed transmissions in drive connections to pulleys 16, 18, 22, 28 and 62).

The stream of filter rods from path 14 is elevated between the conveyors 20, 24 on the path 26 and is conveyed to the outlet 66. Filter rods are delivered from the outlet 66, possibly under the flexible membrane 96, onto the delivery conveyor 84, which moves the rods towards the path 94. The membranes 44 shield the filter rods from engagement and any interaction with the flights 40 of the conveyor 24 on the run of said conveyor between the pulleys 28 and 30 so that the filter rods in that part of the storage region 88 to the right of conveyor 24 in FIG. 1 are not subjected to excessive disturbance. The pulleys 42 may be of slightly greater diameter than the pulleys 28 and/or may be mounted at a slightly offset (e.g. higher) axial position, so that the pulleys 42 (and the surrounding membranes 44) serve to prevent disturbance of the filter rods by the flights 40 of the conveyor 24 also in the region of the outlet 66 (i.e. in the region above the pulleys 28 as well as on the downstream side). The relative positions of the pulleys 28 and 42 and the size of the flights 40 on conveyor 24 should be such that there is sufficient traction for the filter rods in the region of the pulleys 28.

In the event that filter rods are supplied on the path 14 at a rate which is greater than that in which they are delivered on the path 94 the level of filter rods in the region 88 and on the downstream side of the conveyor 24 will rise. Any rise in level is detected by the proximity detector probe 77 of sensor 76 so that a signal is passed along the line 78 to the motor 74 to cause the motor to operate and lift the unit 68 by way of the chain hoist 72. The probe 77 lies closely adjacent the ends of the filter rods downstream of the outlet 66. During such lifting those parts connected to the head unit 68, either directly or indirectly, are raised. In particular, the posts 50, the bracket 52, the expanding members 54, and the conveyor 24 and membranes 44 are raised. The raising of conveyor 24 causes the pulleys 32 and 36 to move to the right as seen in FIG. 1 and the raising of the membrane 44 causes unwinding of the spring 48. During movement of the unit 68 the speed of rotation of the conveyor 24 (i.e. relative to its pulleys) may be slightly reduced, so that the linear speed of the conveyor 24 remains the same as that of the conveyor 20. If the level of filter rods falls a predetermined distance below the sensor 76 a signal is passed along line 78 to cause the motor 74 to lower the unit 68. The speed of conveyor 24 may be increased during downward movement of the unit 68, to maintain the linear speeds of conveyors 20 and 24 at the same value.

In addition to controlling the rate of raising (or lowering) of the unit 68 the signals from the sensor 76 may be used additionally (or in some circumstances, e.g. temporarily, alternatively) to control the speed of the delivery conveyor 84 (and also the conveyor 90). This control may be effected by signals sent along the transmission line 80. Signals from the sensor 76 (e.g. on line 80) may be used to control variable speed transmissions for the conveyors 84, 90, and/or, where the linear speed of the conveyor 24 is increased or reduced to compensate for speed of the head unit 68, a variable speed transmission for the conveyor 24. Where the sensor 76 is incapable of providing both low and high signals, i.e. so that both raising and lowering of the unit 68 may be controlled according to the detected level of filter rods in the region 88, then an additional sensor (e.g. a photocell detector) may be provided to provide a low (or high) level signal. The sensor 76 may be replaced by a pair of spaced photocell detectors (carried by the unit 68) and detecting a high level, at which the unit 68 is raised, and a low level, at which the unit 68 is lowered, the levels being determined relative to the outlet 66. The sensor 76 may be replaced by a conventional pivoted sensor arm, operating a rotary potentiometer or similar regulator for example.

If the unit 68 has reached its uppermost position and the sensor 76 detects the presence of filter rods then normally a signal will be sent to stop the supply of rods on or to the path 14. Similarly, when the unit 68 is in its lowermost position the conveyors 84 and 90 will not be operated until the sensor 76 detects the presence of filter rods.

The links 56 of the expanding members 54 serve to support the inner surfaces of the bands 25 of conveyor 24, and may be provided with a low friction outer surface for this purpose. Although in FIG. 2 the member 54 is shown with relatively short links 56 supporting a single band 25 of the conveyor 24 (the other member 54 and band 25 not being shown in FIG. 2) it will be appreciated that a single device replacing the members 54 and having relatively long links could be used so that the links of the device support both spaced bands 25 of the conveyor 24.

Figure 4:
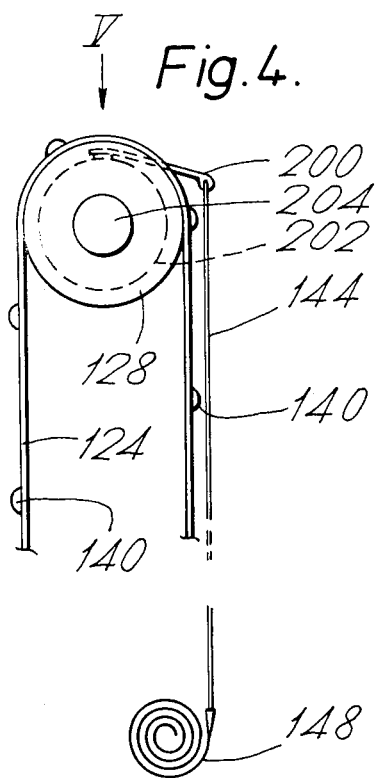
FIG. 4 is a view of part of a modified conveyor system for filter rods.
Figure 5:
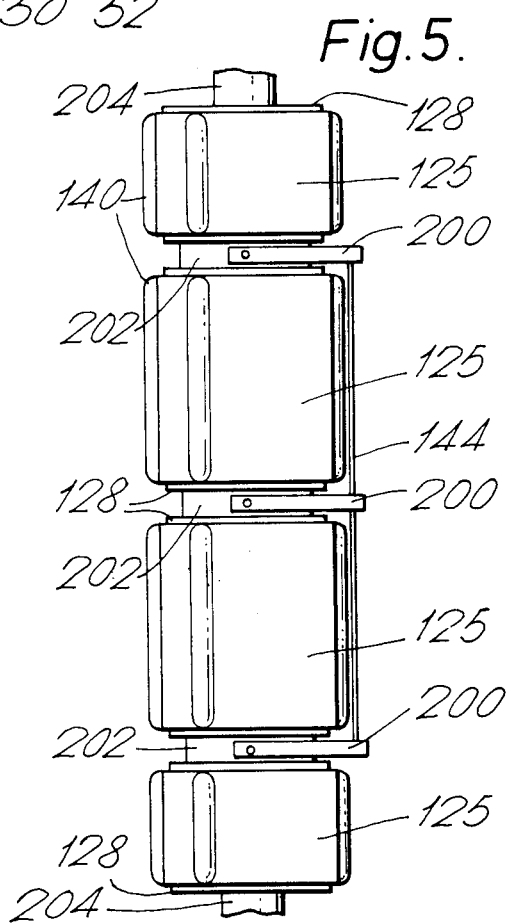
FIG. 5 is a view in the direction of arrow V in FIG. 4.

In the modified system shown in FIGS. 4 and 5 a conveyor 124 comprising laterally spaced bands 125, corresponding to the conveyor 24 and bands 25 in the system of FIG. 1, passes around spaced pulleys 128, which correspond to the pulleys 28. The conveyor 124 has spaced flights 140. A membrane 144, corresponding to the membranes 44, is suspended from three spaced projecting brackets 200 connected to stationary sleeves 202 between the pulleys 128. The sleeves 202 and pulleys 128 are supported on a central shaft 204 which is connected to a head unit similar to the unit 68. The membrane 144 is connected to a spiral spring 148. Operation of the modified system is substantially the same as that of the system of FIG. 1. The axially outermost pulleys 128 (and the corresponding bands 125) may be unnecessary for shorter filter rods.

In a further modification of the conveyor system of FIG. 1 the conveyors 20 and 24 need not be vertical (i.e.

they could be inclined) and need not be parallel (i.e. they could diverge). The conveyor 60 could be substantially at right angles to the path 26 (i.e. in the system of FIG. 1 it could be substantially horizontal). The wall 86 need not be parallel to the conveyor 20 and need not be vertical.

The parts of the storage region 88 above the delivery conveyor 84 may contain flow dividers or other means intended to control or facilitate flow of filter rods from the region 88, and particularly to control the upper level of the filter rods in the region 88. Thus the storage region 88 may contain flow dividers similar to those used in Molins TUDOR tray unloading machines or as shown in British patent specification No. 1585066.

I claim:

1. A conveyor system for rod-like articles, comprising supply conveyor means for supplying rod-like articles in multi-layer stack formation; a variable capacity reservoir for articles; the supply conveyor means including delivery means from which articles are supplied to the reservoir and opposed elevating conveyors, at least one of which is of variable operative length, said delivery means including an endless band conveyor extending only between said opposed elevating conveyors in a direction generally transverse to said elevating conveyors for directing articles from said elevating conveyors into said reservoir; and means for raising and lowering the delivery means in accordance with the level of articles in the reservoir, so that the supply conveyor means provides a variable path length in a substantially vertical direction for rod-like articles in multi-layer stack formation, wherein a downstream end of said endless band conveyor is spaced by a predetermined distance from an upper end of said one of said elevating conveyors so as to form an exit opening for said path through which articles are introduced into said reservoir, wherein said means for raising and lowering said delivery means operates to move the position of said exit opening vertically so as to vary the position at which articles enter said reservoir.

2. A conveyor system as claimed in claim 1, including sensor means for sensing the level of articles in said reservoir, said means for moving including means for raising and lowering at least part of said supply conveyor means in accordance with signals from said sensor means.

3. A conveyor system as claimed in claim 1 which comprises means, for conveying filter rods to a filter cigarette assembling machine.

4. A conveyor system for rod-like articles, comprising a variable capacity reservoir having a floor and upright side walls; endless band conveyor means having a first run at least partly defining an upward path for rod-like articles in multi-layer stack formation and for conveying articles upward on said path and into said reservoir, said endless band conveyor means extending upwardly from said floor between said side walls; guide means forming an upper end of said endless band conveyor means; means for reversible projecting said guide means into said reservoir to vary the length of said path extending upwards into said reservoir, said guide means being located adjacent said floor when said path length is at a minimum; and shielding means movable with said guide means for shielding a second run of said conveyor means from engagement with articles in said reservoir and not on said path, said shielding means being extendable so that its operative length varies with the length of said path.

5. A conveyor system as claimed in claim 4, wherein the endless band conveyor means is provided with spaced means intended to increase traction to aid conveyance of articles on said path, said shielding means comprising a flexible member arranged to hold articles away from said spaced means.

6. A conveyor system as claimed in claim 4, further including extendable support means connected to said guide means.

7. A conveyor system as claimed in claim 6, wherein the extendable support means comprises a plurality of interconnected members having surfaces arranged to support at least one variable length run of said endless band conveyor means.

* * * * *